April 27, 1926. 1,582,717
E. WILDHABER
RAM RECIPROCATING MECHANISM
Filed Sept. 26, 1923   2 Sheets-Sheet 2
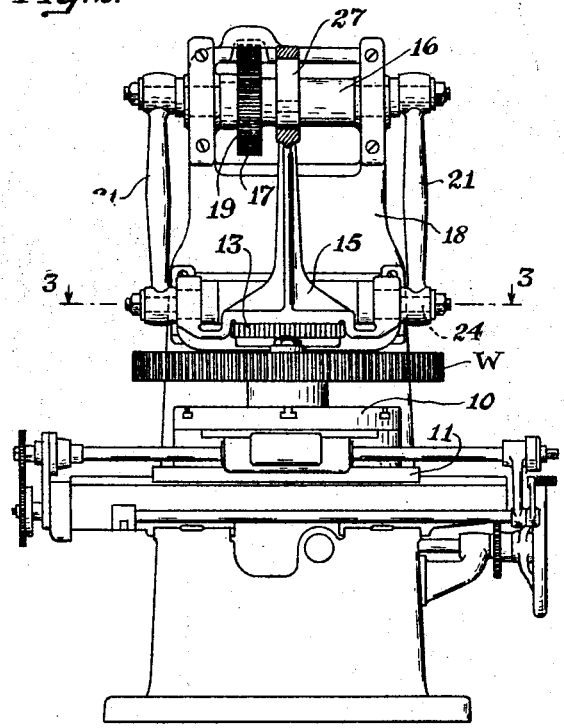
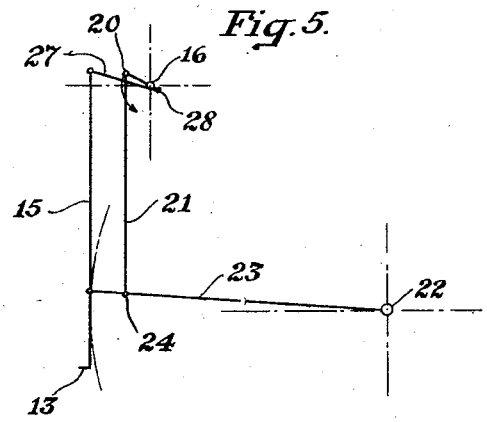 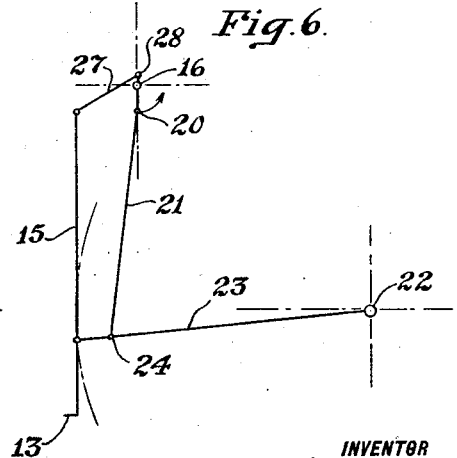
INVENTOR
E. Wildhaber
BY
Joseph W. Schofield
ATTORNEY Patented Apr. 27, 1926.

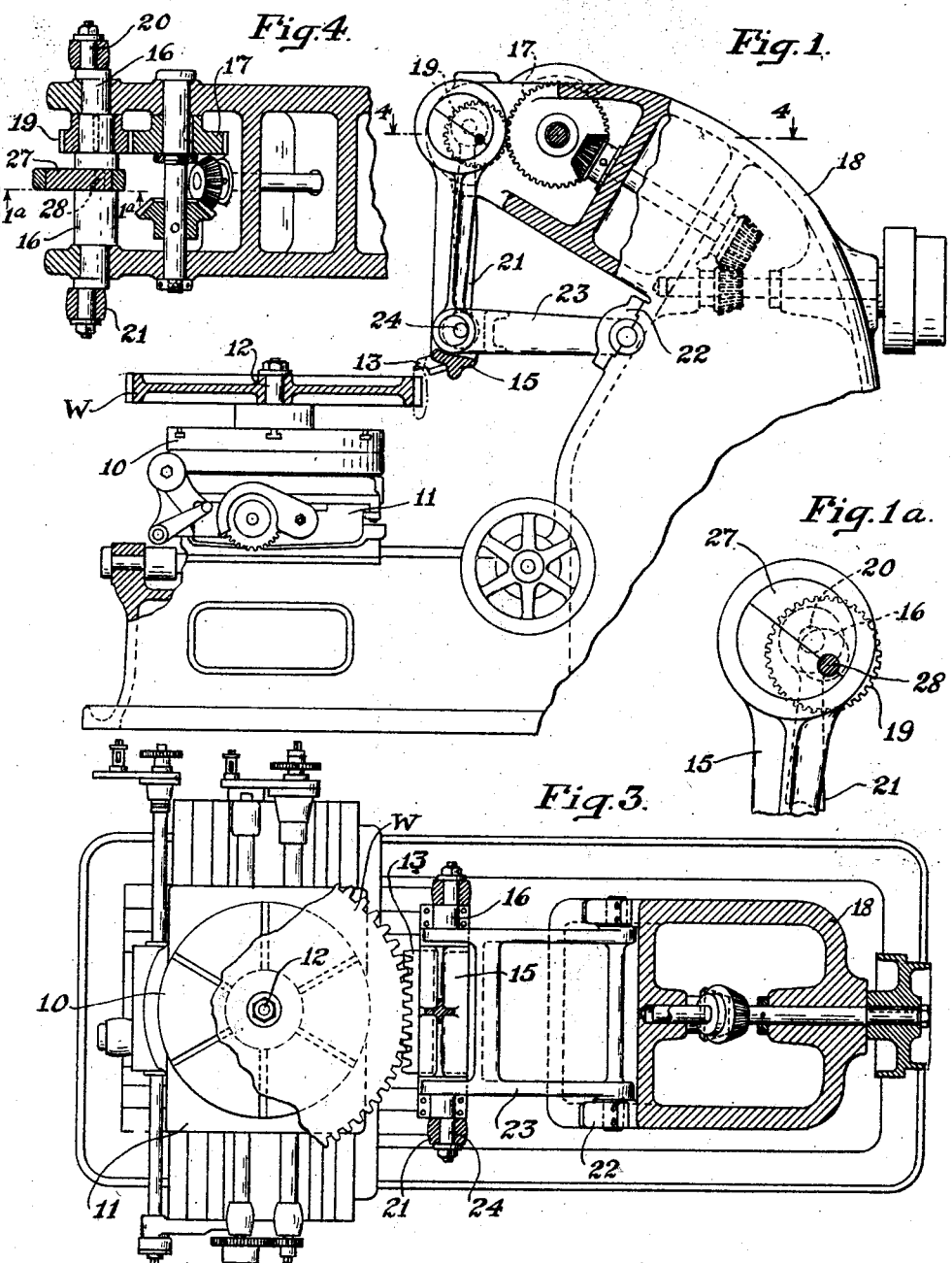

1,582,717

UNITED STATES PATENT OFFICE.

ERNEST WILDHABER, OF BROOKLYN, NEW YORK, ASSIGNOR TO MAAG GEAR WHEEL AND MACHINE COMPANY, LTD., OF ZURICH, SWITZERLAND, A CORPORATION OF SWITZERLAND.

RAM-RECIPROCATING MECHANISM.

Application filed September 26, 1923. Serial No. 664,920.

*To all whom it may concern:*

Be it known that I, ERNEST WILDHABER, a citizen of the Republic of Switzerland, residing at Brooklyn, in the county of Kings and State of New York, have invented certain new and useful Improvements in Ram-Reciprocating Mechanism, of which the following is a specification.

This invention relates to gear planers and to other types of machines having a reciprocatory ram or tool adapted to be operated at high speed. More particularly, the invention relates to mechanism comprising a novel form of linkage for reciprocating the tool or ram of a machine tool.

An object of the present invention is to provide means to reciprocate a ram or tool in a straight line through a predetermined stroke by suitable linkage.

Another object of the invention is to provide linkage for actuating a ram or tool at high speed with a minimum of shock and vibration. Also an object of the invention is to actuate the ram or tool in its cutting direction substantially in a straight line and on its return movement in a slightly retracted path.

In the past, it has been the practice to reciprocate rams on gear shapers and other machines by means of a crank and connecting rod, the ram itself being slidably mounted within suitable guideways. In the present instance, means are provided which eliminate all necessity for guideways for the ram, the linkage being so designed that it maintains the ram or tool head accurately in operative positions during all of its movement.

More particularly, the invention is adapted for application to a gear planing machine of the type shown in the patent to Maag, 1,290,270 and is directed to improved means for actuating the rack tool shown therein at high speed in a vertical plane.

With these and other objects in view, my invention consists in the features of construction and operation set forth in the following specification and illustrated in the accompanying drawings.

In the accompanying drawings annexed hereto and forming a part of this specification, I have shown my invention embodied in a spur gear planing machine but it will be understood that the invention can be otherwise embodied and that the drawings are not to be construed as defining or limiting the scope of the invention, the claims appended to this specification being relied upon for that purpose.

In the drawings:

Figure 1 is a side elevation of a gear planing machine partly in section made according to the present invention.

Fig. 1$^a$ is an enlarged view taken on line 1$^a$—1$^a$ of Fig. 4 showing a part of the mechanism.

Fig. 2 is a front elevation of the machine showing the ram and its actuating mechanism.

Fig. 3 is a plan view partly in section of the machine and the linkage for the ram taken on line 3—3 of Fig. 2.

Fig. 4 is a sectional view taken on line 4—4 of Fig. 1, and

Figs. 5 and 6 are diagrammatic views of the tool actuating linkage shown in different operative positions, the proportions of the parts being exaggerated to more clearly illustrate their construction.

In the above mentioned drawings, I have shown but one embodiment of the invention which is now deemed preferable but it is to be understood that changes and modifications may be made within the scope of the appended claims without departing from the spirit of the invention.

Briefly, my invention in its broadest aspect comprises the following principal parts: First, a rotatably mounted driving shaft having a crank or eccentric thereon, rotation of which is used to impart operative movements to the ram or tool; second, a tool carrying lever or arm; third, an oscillating arm, one end of which may pivot about a fixed point and the other end of which is pivotally attached to an intermediate point of the tool carrying lever; fourth, crank and connecting rod means attached to the oscillating arm to effect reciprocating movements of the tool carrying lever; and fifth, means attached to the tool carrying lever to oscillate it slightly during its reciprocatory movement, these latter means operating to produce a straight line downward movement of the ram and a curved upward movement in a retracted position.

Referring more in detail to the figures of the drawings, the present invention is shown applied to a spur gear planing machine of the type disclosed in the above mentioned patent. This type of gear planing machine has a rotary table 10 mounted upon a slide 11, the slide 11 and table 10 being actuated in predetermined relation to each other so that a gear blank W mounted upon a spindle 12 on the table 10 may be given a rolling movement as if it were being rolled upon its pitch circle. Movements of the slide 11 and table 10 are such that the blank W is in effect rolled past the cutter or tool 13 which is mounted upon the lower end of the tool carrying lever or frame 15. As the construction and operation of the parts carrying the gear blank W are or may be similar in every way to those described in the above mentioned patent, further description thereof is thought to be unnecessary.

In order to actuate the tool 13, which is in the form of a rack having a plurality of cutting surfaces, in a vertical plane so that on its downward stroke it may engage the surface of the blank W and generate tooth curves thereon, a driving shaft 16 is provided which may be driven by any suitable means as by means of the gear 17 mounted on the column 18 and in mesh with a gear 19 on this driving shaft 16. Mounted on the opposite end portions of this main driving shaft 16 are eccentric journals 20 and surrounding them and engaging against their periphery are the upper ends of suitable connecting rods 21. It will be seen from the above description that by rotation of the driving shaft 16 and the eccentrics 20, these connecting rods 21 will be vertically reciprocated.

Pivotally mounted within a portion of the column 18 of the machine and within suitable bearings 22 is a substantially horizontally disposed arm or frame 23, the forward end of which is pivotally mounted on suitably fixed pins 24. At a point 24 near the forward end of this arm or frame 23 it engages the connecting rods 21 above referred to so that movement of the connecting rods by their eccentrics 20 serves to oscillate the arm 23. Referring to Figs. 5 and 6, the elements of the invention in diagrammatic form and their operative movements will be more clearly seen. Rotation of the eccentrics 20, shown as their equivalent crank arm, in these figures, actuates their connecting rods 21 shown as a single member. The lower ends of these connecting rods 21 are pivotally mounted at an intermediate point of the horizontally extending arm or frame 23 so that this arm is oscillated up and down above and below its horizontal plane.

Pivotally attached to the oscillating arm 23 at its extreme forward end is the tool carrying lever 15. This, as shown, comprises a frame. As shown most clearly in the diagrams, this lever or frame 15 extends a short distance below the point at which it joins the oscillating arms 23. At this lower end of the lever, attaching means of any preferred form are provided for the rack form tool 13.

At the upper end of the tool carrying lever 15 is a circular disk 27 of large diameter, this being suitably rotatably secured within an opening formed in the upper end of the lever 15. In the preferred form of the invention, this disk may be rotatably mounted on a small eccentric portion 28 of the main driving shaft 16. In the diagrammatic views, this disk 27 and the small eccentric 28 are shown as their equivalent crank and connecting rod. The effect of rotation of the main driving shaft 16 and the eccentric 28 formed thereon is to cause rotation of the disk 27 within its opening formed in the lever 15. The movement of the lever 15 induced by these means is one of oscillation as will be at once evident from an inspection of Figs. 5 and 6. This oscillation also takes place during the vertical reciprocatory movement of the lever 15 and therefore modifies the movement of this lever 15 as induced by the oscillation of the frame 23. For convenience in assembling this disk 27 on the shaft 16, it may be made in halves as shown in Fig. 1ª.

From the above described construction, it will be seen that rotation of the main eccentrics 20 and the resulting oscillation of the horizontally mounted arm or frame 23 serves to reciprocate the tool carrying lever through a predetermined path. Also the oscillating frame 23 serves to take up part of the thrust of the tool 13 during its engagement with the work.

The eccentric or disk 27 acting on the upper end of the tool carrying lever 15 serves to slightly oscillate this lever and therefore modify the movement of its lower end at which point the tool 13 is attached. This oscillation of the lever 15 is proportioned and timed by the relative ratio and relative positions of the cranks or eccentrics on the shaft 16 so that on the downward stroke of the tool 13 its movement is substantially in a straight line, and, during its upward movement, the tool is retracted sufficiently from this straight line to be free from engagement with the work. This movement of the cutter is indicated by the dotted oval shown in Fig. 1.

I have found that with linkage having substantially the following dimensions and proportions, the deviation of the tool 13 from a straight line during the major portion of its downward movement does not exceed .001 of an inch. The principal dimensions were as follows: length of oscillating arm approximately 15″; length of tool carrying lever 18″; crank for reciprocating the tool carrying lever, approximately .73″ radius; length of the secondary crank or eccentric .8145″ radius; and the ratio of the total length of the tool carrying lever relative to the portion below its pivot, was approximately 11.86 to 1.

From the above it will be seen that the reciprocation of the cutter on its cutting stroke is substantially a straight line and is accomplished entirely by linkage. As this linkage is actuated by a rotating shaft 16, it is entirely free from sudden reversals of movement and therefore the movement of the cutter 13 is free from shocks and vibrations. The speed therefore of the cutter on its operative stroke can be made very rapid, as fast in fact as permitted by the cutting action of the tool 13.

Also by reason of the secondary crank or eccentric, the tool carrying lever is oscillated in such manner and in timed relation to its reciprocatory movement that its return movement takes place on a retracted path. The path of movement of the cutter is therefore in an elongated vertical loop or ellipse, the length of which corresponds to the fixed stroke of the cutter and the width corresponds to the movement of the cutter away from the work to clear it on its upward or inoperative stroke.

What I claim is:

1. Actuating mechanism for a reciprocatory tool carrying ram comprising in combination, an oscillating arm, a connecting rod attached thereto, means to actuate said connecting rod to oscillate said arm, a tool carrying lever attached at an intermediate point to said oscillating arm and having a tool mounted at one end thereof, and crank means on the same axis with the actuating means attached to the upper end of said tool carrying lever to vary the oscillatory movement of the tool induced by said connecting rod.

2. Actuating mechanism for a tool carrying ram comprising in combination, a rotatable shaft having a pair of eccentrics thereon, a disc adapted to be rotated, connecting rods one end of each of which engages said eccentrics, an oscillating lever pivotally mounted at one end and attached at an intermediate point to said connecting rods, a lever attached at an intermediate point to said oscillating lever and attached to a supplementary rotating disk on the same axis as said eccentrics at its upper end, and a cutting tool mounted at the opposite end of said lever.

3. Actuating mechanism for reciprocating a tool comprising in combination, an oscillating arm, a connecting rod pivotally connected thereto, means to actuate said connecting rod to oscillate said arm, a tool carrying lever attached to said oscillating arm and having a tool mounted at one end thereof, and means on the same axis with the actuating means to oscillate the opposite end of said lever in timed relation to its reciprocation to cause said tool to move in a substantially straight path in one direction and in a retracted curved path in the opposite direction.

In testimony whereof, I hereto affix my signature.

ERNEST WILDHABER.